US008732800B1

(12) United States Patent
Askew (10) Patent No.: US 8,732,800 B1
(45) Date of Patent: May 20, 2014

(54) SYSTEMS AND METHODS FOR CENTRALIZED MANAGEMENT OF POLICIES AND ACCESS CONTROLS

(76) Inventor: Jerry Askew, Granada Hills, CA (US)

( * ) Notice: Subject to any disclaimer, the term of this patent is extended or adjusted under 35 U.S.C. 154(b) by 763 days.

(21) Appl. No.: 12/056,168

(22) Filed: Mar. 26, 2008

Related U.S. Application Data

(60) Provisional application No. 60/908,060, filed on Mar. 26, 2007.

(51) Int. Cl.
*H04L 29/06* (2006.01)

(52) U.S. Cl.
USPC .............................................. 726/4; 713/182

(58) Field of Classification Search
USPC .................................................. 726/4
See application file for complete search history.

(56) References Cited

U.S. PATENT DOCUMENTS

| | | | | |
|---|---|---|---|---|
| 5,315,657 A | * | 5/1994 | Abadi et al. | 726/4 |
| 5,889,953 A | * | 3/1999 | Thebaut et al. | 709/221 |
| 2001/0049793 A1 | * | 12/2001 | Sugimoto | 713/200 |
| 2004/0070604 A1 | * | 4/2004 | Bhat et al. | 345/741 |
| 2004/0117407 A1 | * | 6/2004 | Kumar et al. | 707/200 |
| 2004/0153552 A1 | * | 8/2004 | Trossen et al. | 709/229 |
| 2005/0021487 A1 | * | 1/2005 | Verma et al. | 707/1 |
| 2006/0156385 A1 | * | 7/2006 | Chiviendacz et al. | 726/2 |
| 2006/0224897 A1 | * | 10/2006 | Kikuchi et al. | 713/182 |
| 2007/0027866 A1 | * | 2/2007 | Schmidt-Karaca | 707/6 |
| 2007/0033654 A1 | * | 2/2007 | Wilson | 726/27 |
| 2007/0079384 A1 | * | 4/2007 | Grinstein | 726/27 |
| 2007/0157288 A1 | * | 7/2007 | Lim | 726/1 |
| 2007/0174360 A1 | * | 7/2007 | Yagawa | 707/204 |
| 2007/0180258 A1 | * | 8/2007 | Broussard et al. | 713/182 |

OTHER PUBLICATIONS

The authoritative Dictionary of IEEE standards, Seventh Edition, p. 872.*

* cited by examiner

*Primary Examiner* — Yogesh Paliwal
(74) *Attorney, Agent, or Firm* — Blakely Sokoloff Taylor & Zafman LLP (57) ABSTRACT

Methods and apparatus for centralized management of policies and access controls which provide for the storing and managing of business rules and elements of policy, and for implementing the rules and policy across heterogeneous business systems. Where rules and policies may conflict in certain cases, mechanisms for reconciling such conflicts may be provided.

89 Claims, 4 Drawing Sheets

Detail example with Access Control Actions

Fig. 4

SYSTEMS AND METHODS FOR CENTRALIZED MANAGEMENT OF POLICIES AND ACCESS CONTROLS

CROSS-REFERENCE TO RELATED APPLICATION

This application claims the benefit of U.S. Provisional Patent Application No. 60/908,060 filed Mar. 26, 2007.

BACKGROUND OF THE INVENTION

1. Field of the Invention

The present invention relates to the field of risk management.

2. Prior Art

Many computer applications provide methods for controlling Access to Resources based on the identity of the account being used to perform said Access. Applications may also provide varying levels of Access (e.g. the ability to change data and/or others Access rights, view-only permissions, the ability to perform certain operations as well as the ability to completely deny Access). Applications typically provide mechanisms to set Access Controls.

DETAILED DESCRIPTION OF THE PREFERRED EMBODIMENTS

Definitions

Figure 1:
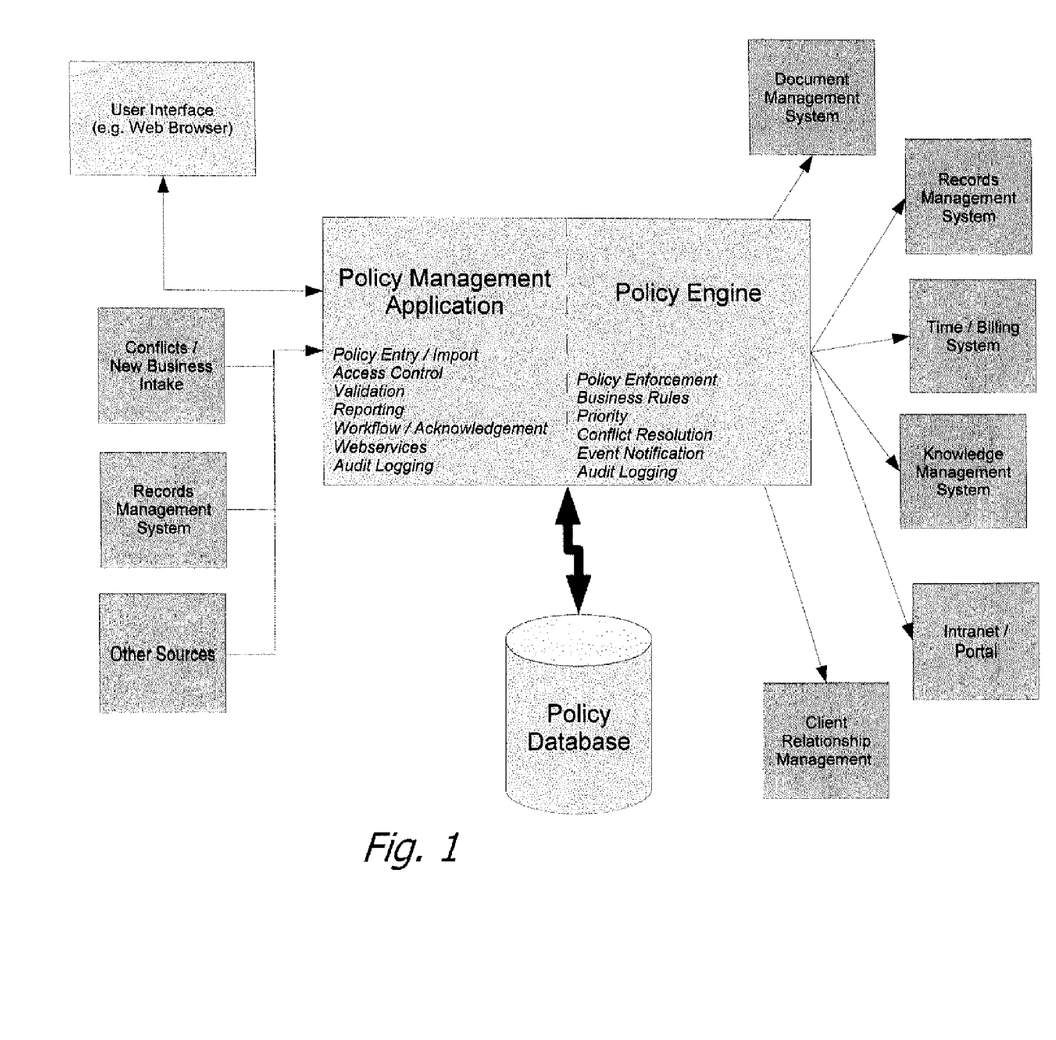
FIG. 1 illustrates the four components of a preferred embodiment of the present invention.

The following terms used herein are defined as follows:

Applications or Systems: Preexisting computer software, or as altered, to carry out various functions of a law firm or other business, such as document management Systems, time and billing Systems, etc. Examples are illustrated in FIG. 1.

Programs: Computer software used to practice the present invention. Programs typically are stored on a machine readable storage medium having stored thereon a sequence of instructions which, when executed by a computer, cause the computer to perform a method of the present invention.

Policy: A Policy consists of one or more Directives that together form a practical expression of a company Policy (a stated business requirement which may be derived from, by way of example, best practices, risk management decisions, recordkeeping requirements, client requirements, court orders and tax rulings.) Examples: a) Access to European Union matters is limited to attorneys in the Paris office. b) Materials related to a matter must be purged within 5 years of matter close. c) Access to HR materials is limited to HR personnel. d) All final invoices must remain in a given client's "Invoices" Folder. e) Fees or costs in excess of a matter's budget may not be released for billing.

Directive: An explicit instruction, the purpose of which is to enforce, support or effect company Policy—perhaps one component of a larger Policy. Examples: a) Secure Resources belonging to client #1234 to John Smith and Jane Brown. b) For any matter with a close date over 5 years in the past, delete all e-mails and mark all folders for recall/destruction. c) Secure documents authored by any HR employee to the HR department only. A Directive is minimally comprised of Criteria and Actions.

Criteria: Criteria is used to determine which Resources a Directive applies to. Typically a list or range of Metadata values (by way of example, clients #1234 and #1235, All HR data except holiday calendars, and All documents in the document management System).

Resource: Any object that may be the subject of firm Policy (by way of example, a document, folder, client data, matter/case data, time entry, file or a calendar). A Resource is typically identified by Metadata and has Properties associated with it.

Properties: Any information associated with a Resource which is subject to change as a result of one or more Actions. Properties include, by way of example, descriptive information, categorizing information, Access Control information, status and state of existence.

Metadata: Information that describes or classifies a Resource (by way of example, client/matter number, department, object type or location), including its Access Control information if any. Metadata includes some or all of a Resource's Properties as well as inferred information about a Resource—e.g. a Resource's location may be inferred from the physical location of a file, even though that particular Resource has no "location" Property per se.

Item: An Item is a Resource that represents the minimum content that is Accessible as a unit. Examples are a word processing document, a spreadsheet, a scanned document and a database entry.

Actions: Any Actions that can be performed within the context of a firm's Systems. Actions may directly affect a Resource or its Properties (the exact nature of the available Actions is dependent on the Resource and the System that the Resource is contained in), or may have no direct affect on a Resource. Examples are: reverse an entry, delete an Item, notify person(s), record in audit log, relocate Resource, change status, and an Access Control Action. Actions may be specific to a particular kind of Resource or System, or may have broad applicability. Actions can potentially conflict if multiple Directives apply to a Resource. This is especially true for Access Control Actions.

Access: The ability to find, view or change, or the ability to perform any combination of finding, viewing or changing, a Resource or its Properties (including Access Controls) by invoking an Application.

Access Control: Any mechanism provided by an Application that provides control over Access to Resources. As an example, an accounting System might permit only certain users to finalize a bill, or a time entry System might disallow entries outside of a given date range. The most fundamental example of Access Control would be a Discretionary Access Control List (DACL) used in many Applications to grant or deny read, change, create and/or delete rights to objects.

Access Control Actions: Actions that alter Access Controls, typically limiting or guaranteeing Access to Resources by certain Principals. Conflicts are common when Access Control Actions appear in multiple Policies. The present invention includes mechanisms for combining and merging Access Control Actions, when necessary, to achieve meaningful results.

Principals: The persons or Systems affected by Access Controls. Principals can be specified directly (by way of example, by username or employee number), or indirectly (e.g. by department, group membership, active/inactive status, location or other organizational attributes, association with a client or matter, having existing Access to certain Resources and recent activity).

Domain: Used to classify Directives and to specify Behaviors for merging the Actions of multiple Directives. Domains consist minimally of an identifier, a priority and a set of Behaviors, such as exclusion, or Access alone or Access with change rights. Example: Ethical Walls erected to address conflicts are assigned to the 'EW' Domain. Directives for Confidential matters are assigned to the 'CONF' Domain. Directives for highly confidential matters are assigned 'TS' (Top Secret). A Directive allowing support staff to Access all materials is assigned to Domain 'OPS'. The 'TS' Domain is given the highest priority and the Behaviors dictate that all applicable 'TS' Directives combine in the most restrictive fashion (an 'intersection' operation in set arithmetic). Furthermore, Policies from other Domains may further restrict Access, but may not broaden it. The next highest priority in the 'CONF' Domain, which also uses an intersection operation to combine Directives. Unlike the 'TS' Domain, 'CONF' allows the 'OPS' Directives to extend Access to support staff (a 'union' operation). All Domains finally specify that Principals in the 'EW' Directives are removed (subtract operation). This ensures that despite any Policy to the contrary, conflict-of-interest Policies are always followed. Note that even though the 'EW' Domain may have a low priority, the behavior mechanism allows these Directives to be properly considered within the context of the higher priority Domains.

Behaviors: Behaviors specify the methodologies used to merge and combine complex Actions, such as Access Control Actions. For example, a behavior may indicate that Access Control lists within a given Domain are combined so as to yield the most restrictive interpretation. Alternatively the behavior may indicate that Access Control lists combine so as to maximize Access. These examples can be likened to the "intersection" and "union" functions of set arithmetic. Separate Behaviors can be specified for governing the combination of Access Lists within a Domain (intra-Domain) as well as between Domains (inter-Domain). Multiple inter-Domain Behaviors may exist—one for each inter-Domain relationship.

Organizations often need to implement Policy across multiple Systems based to some degree on a common set of Criteria. Examples include, without limitation, a) a company may need to restrict Access to a confidential project, or b) a law firm may need to exclude certain people from a matter in order to mitigate an internal conflict of interest, or c) a firm may wish to prevent unauthorized or over-budget charges from being submitted to a matter. The present invention allows these Policy scenarios to be effected across multiple Applications, while being managed from a single point. Computer Applications may include, for example, Document Management Systems, Records Management Systems, Time Entry Systems, Knowledge Management Systems, Litigation Support Systems, Docketing Systems, Performance Review Systems, Customer Relationship Management Systems, E-mail Systems, Personal Calendar and Contact Systems and Accounting and Billing Systems.

The present invention interfaces with such Systems which contain or manage Resources and optionally have methods of storing Properties, including Access Control. The present invention is comprised minimally of a) One or more Programs that monitor or enumerate Resources and perform Actions in accordance with Policies and b) persistent storage, such as a database to store Policies. Policies are ultimately maintained by authorized persons, custodians so to speak.

A preferred embodiment of the present invention described herein has four components, as shown in FIG. 1:

1) A Central Policy management Program (Policy Management Application) that allows the input and management of Policies and changes thereto.

2) A database (Policy Database) that stores the Policy information.

3) A Program (Policy Engine) that performs Actions in an organization's various Applications based upon the Policies in the database (Item #2). This Program is run on an ad-hoc or scheduled basis and/or as required by Item #4.

4) One or more Programs (Change Detection System) that monitor changes to Policies, Principals, Properties and/or Resources and then invokes the Policy Engine (Item #3) to ensure that Resources are acted upon according to the Policies contained in the database (Item #2).

Policies

Policies are made up of one or more Directives. For example, two clients, ABC Inc. and DEF Inc., who are competitors, may require that no one affiliated with the opposing company have Access to the first company's account. Such a Policy might consist of the following Directives:

1. People who have worked on ABC Inc. matters may not Access DEF Inc. matters.

2. People who have worked on DEF Inc. matters may not Access ABC Inc. matters.

3. Barbara Jones may not Access DEF Inc. matters because she was previously employed by ABC Inc.

Directives are composed of:

Criteria—Used to specify which Resources the Directive applies to.

Domain (optional)—As defined. The Domain may be specified at the Policy level, in which case the Domain applies to all Directives in that Policy.

Actions—As defined. Access Control Actions may be applied to Resources in a variety of ways:

A) The Access Control Action(s) specified in the Policy are applied to the Resources, overwriting any existing Access Controls. Manual changes to the Resources' Access Controls are either disallowed, or are overwritten by the Program. This is a Mandatory Access Control Action.

B) The Access Control Action(s) specify the maximum allowable Access that Principals have to the Resource(s). Changes may be made to the Resources' Access Controls so long as the scope of Access does not exceed that which is allowed by the Policy. In this case, it is permissible for additional, more restrictive controls to be placed on the affected Resources (presumably by a user via an Application). The function of the Program in this case is to a) ensure that Access Controls are not altered in a way that allows Access to Resources by individuals or Systems that are not permitted by Policy and b) preserves additional restrictions that have been placed on a Resource. This is a Limiting Access Control Action.

C) A special case of the Limiting Access Control Policy is where the maximum rights encompass all available rights. In this case, Principals may be initially provided with the default rights to the Resources, but the Resources Access Controls may be reset as desired (but only for the Principals in the Policy). This is a Gateway Access Control Action.

D) The Access Control Action(s) in the Policy specify a minimum level of Access to the Resources. This is basically the inverse of a Limiting Access Control Policy and is called an Access Guarantee Action.

E) The Access Control Actions specify the Access Controls that are to be applied to a Resource in the event that its Access Controls are removed or defaulted (Example: the Resource is made public, or full rights are granted to "Everyone")

Policies may be organized into Partitions in order to facilitate better management of the Policies. Partitions may be used to organize sets of Policies by purpose, source or other factors. As an example, an organization's Human Resources department may have a Partition, Accessible only to them, in order to define Policies that protect sensitive personnel information. Another Partition may be designated to contain Policies imported from a conflict management System or records management System. Each Partition may be restricted such that only certain users may view and/or make changes via the Policy Management Application. In the latter example, wherein Policies are imported from another Application, the Partition may be restricted such that no-one is allowed to make changes and/or view the data from the Policy Management Application. In this case, the Policies are completely controlled by the source Application.

Central Policy Management Application

The Central Policy Management Application may include logic to flag Policies that conflict, or to prevent entry of Policies that conflict. For example, a Policy containing a Mandatory Access Control Action may be entered that provides Access to certain Resources to user A, but a Policy containing a Limiting Access Control Action exists covering some of the same Resources, which does not allow Access to user A. The aforementioned Policies conflict with each other wherever they both apply. Policies may conflict in non-obvious ways. For instance, the first Policy may apply to all Resources in Department X, while the second Policy may apply to all Resources related to Client/Matter aaaa-bbb. The Policies will conflict only for Resources which belong to Department X and are related to Client/Matter aaaa-bbb. A similar, yet simpler scenario exists when one Policy applies to a Client while another Policy applies to a specific matter (i.e., case or job) belonging to that client. The central Policy Management Application may flag or prevent such occurrences, or rely on Behaviors to resolve the conflict. The present invention may open a dialog with the custodian, pointing out the conflict, and if no resolution is apparent, apply the next higher restriction, i.e., so as to cover the conflicting restrictions, even if that resolution imposes some further restrictions, until the conflict is resolved.

Policy Engine

The Policy Engine operates as follows: The Program reads in the applicable Policy information contained in the Policy Database, which includes Criteria and Actions. The Program then reads in the Properties, including Access Control information, for each of the applicable Resources, as identified by the Criteria, in each of the Applications managed by the Program. The Access Control information for each Application input to the present invention is typically stored in a database. The Access Control information of each Resource is analyzed and reduced to a list of Principals and their corresponding Access rights. The Program then locates and reads any Directives from other Policies that apply to the current Resource. Any Actions specifying Access Controls are reduced to a list of Principals along with the rights dictated by the Action. All Actions are evaluated and, if the Actions do not conflict, they are carried out. In the case of Access Control Actions, the Access Control lists are compared and, if necessary, the Resources Access Controls are adjusted to comply with the Policy in accordance with the Access Control Action's type (mandatory, limiting, etc. above). Alternatively or concurrently, the Program may notify people, (custodians and/or otherwise) if inconsistencies between the Policies and the Resources Access Control settings are detected. For example, if the Resource's settings permit Access, either directly or indirectly (e.g. via a group or other mechanism), that are restricted or otherwise limited by the Policy, the Program will detect this situation and then modify the Resources Access Control settings such that it complies with the Policies specified in the database and/or notify people via electronic messaging (Example: e-mail or instant message) of the condition. Similarly, if a Resource's Access Control settings result in restricting Access which is either mandated or guaranteed by the Policy, the Program will detect this condition and then restore Access and/or send notifications.

The Policy Engine may include logic to resolve Policies that are in conflict. The resolution is implementation specific and is performed according to the Behaviors contained in the Controlling Domain. For instance, if Policies exist for both a client as well as for a particular matter belonging to that client, the Program may give priority to the matter level Policies. In other cases, the Policies may be merged. For instance, if a Policy permits only users A and B Access to Resources from Dept. X. and another Policy permits only users B and C Access to Resources related to matter aaaa-bbb, the Program may create a composite of these Policies and allow only user B to Access Resources that fall under both Policies. Other Behaviors are possible and are based on business needs.

Change Detection System

The Program identified as Item #4 is optional and serves to provide real-time response to changes in Policies or changes made to Resources or a Resource's Properties. This may be implemented in various ways:

- As an intrinsic part of the central Policy Management Application.
- As an intrinsic part of an Application that manipulates a Resource, or as an adjunct via APIs (Application Program interfaces) offered by the Application.
- Implemented as a trigger on the Policy Database.
- Implemented as a trigger on a database that regulates Access to the Resource or otherwise indicates changes to a Resource or its Properties.
- It may scan the Policy Database and/or Resources looking for changes that may require review.

Example Application

A typical Application of the present invention would be to enforce ethical walls in a law firm. Firms routinely encounter internal conflicts of interest wherein the firm is required to ensure that information related to a particular matter can not be Accessed by attorneys that have a conflicting interest. Although documents can be secured such that the identified attorneys can not Access them, nothing prevents another individual (who has Access) from unwittingly removing the security settings from the document.

For the above case, a Policy would be created that prohibits the conflicting attorneys from Accessing information related to the matter in question. The Policy Engine would enforce this Policy by applying the proper security to the documents associated with the matter. In the event that someone creates a new publicly Accessible document, or changes the security of an existing document, the Policy Engine will re-evaluate the current security settings and determine if it is in compliance with the Policy. If not, the Program will adjust the security such that the document is in compliance. In this way, the described invention allows the firm to ensure that its commitments to confidentiality are met.

Figure 2:
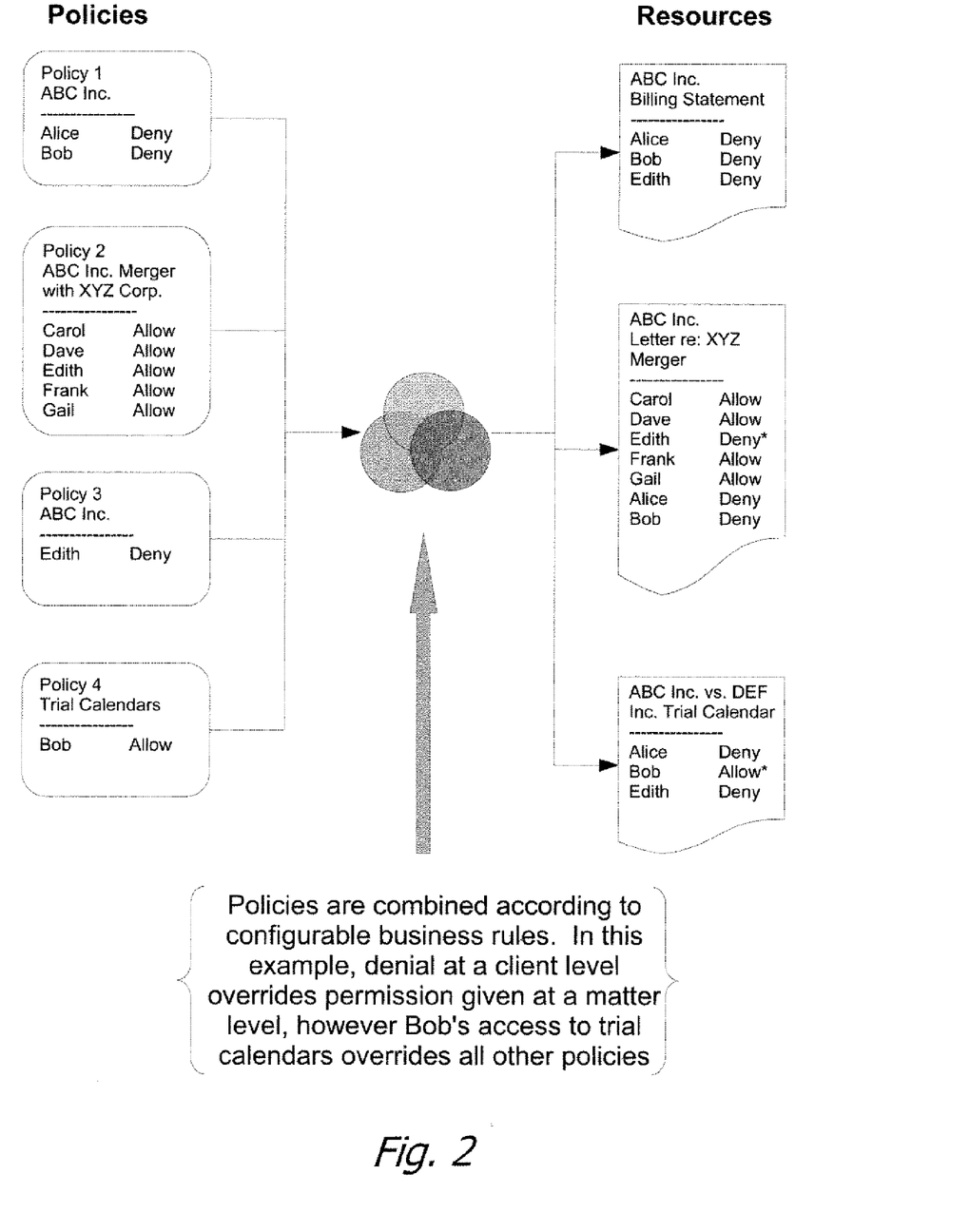
FIG. 2 illustrates an example of Policies and their effect on Resources in accordance with the present invention.

An example of Policies and their effect on Resources is presented in FIG. 2. In this example, Policy 1 denies Access to any information on ABC Inc. to Alice and Bob.

Policy 2 grants Access to information on ABC Inc. merger with XYZ Corp. to Carol, Dave, Edith, Frank and Gail. Policy 3 denies Access to ABC Inc., and Policy 4 grants Access to trial calendars to Bob. The Resources involved in this example are ABC Inc. Billing Statement, ABC, Inc. Letter re: XYZ Merger and ABC Inc. vs DEF Inc. Trial Calendar. Clearly there are conflicts here. Bob is denied Access to ABC Inc. information generally, but granted Access to Trial Calendars, that include an ABC Inc. case. This is resolved by a chosen business rule that the need for Access to a Trial Calendar overrides a general denial of Access to other matters of the same client, so Bob is given Access to the desired Trial Calendar. In Edith's case, by a chosen business rule, Policy 3 overrides Policy 2, so Edith is denied Access to the letter re the merger. In that regard, Policy 2 may apply to the mergers and acquisitions group, with Policy 3 excepting a specific individual from the blanket group Access privileges. Of course, FIG. 2 only relates to Access rights, or Access and change rights without a distinction, though generally Access with or without change rights typically would be granted, or simply Access denied. Also in this example, names have been used (Policy 2 may have been set by initially identifying a group, not individuals by name), though employee numbers or other identifications may be used also and/or instead.

It should be noted that in the example of FIG. 2, Policies 1 and 3 relate to all information and matters relating to ABC, Inc., whereas Policy 2 relates to a specific matter of ABC, Inc. and Policy 4 relates to specific matters of all clients in litigation. Regardless of the span of the Policy, client-wide, spanning clients or some subdivision of the client, the Policies are combined and conflicts resolved and then applied to each Resource, overwriting or modifying any existing Access Control information.

Figure 3:
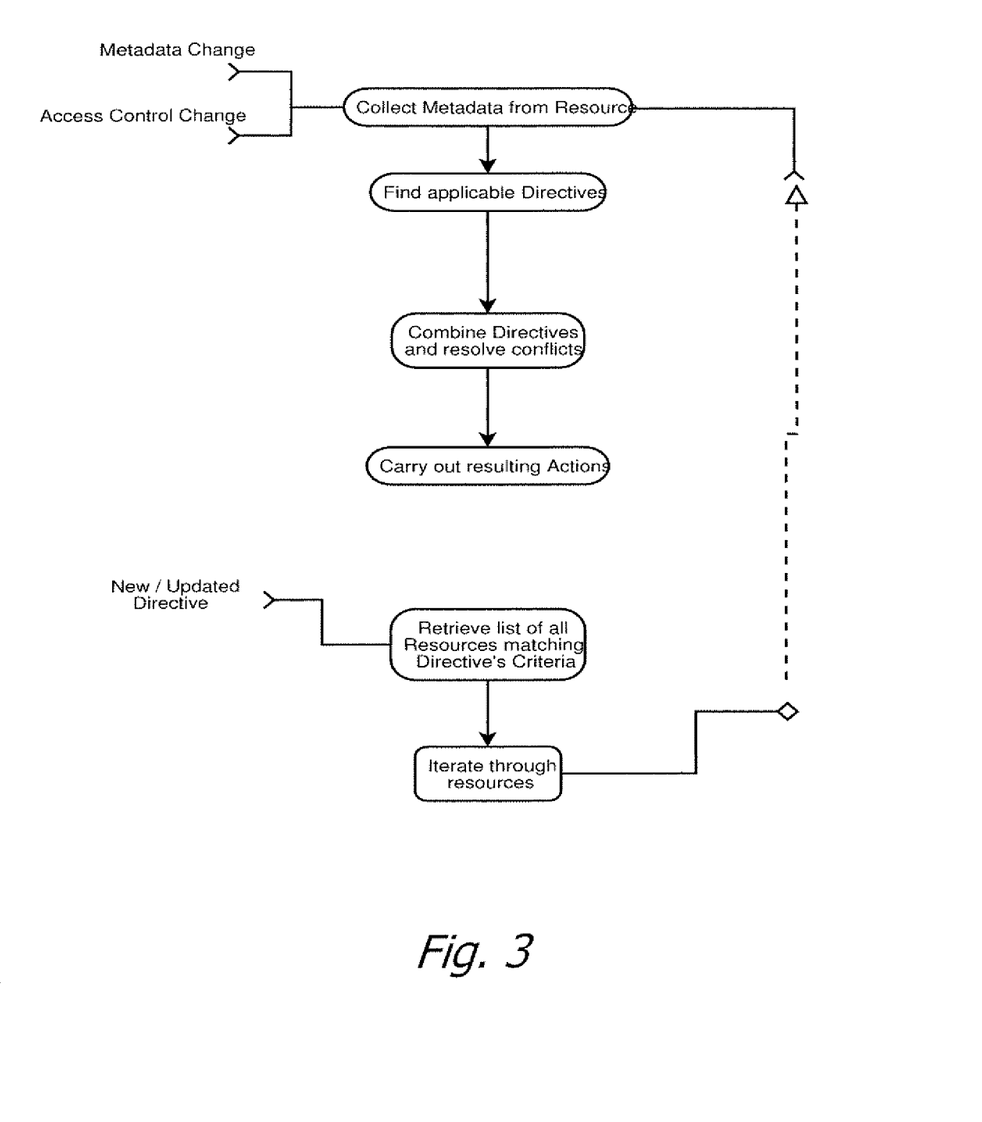
FIG. 3 provides a high level overview of the operation of the present invention.

FIG. 3 provides a high level overview of the operation of the present invention. In particular, whenever there is a Metadata change or an Access Control change, the Metadata is collected from the Resource, the applicable Directives are located and combined in a manner to resolve conflicts generally in accordance with pre-established business rules, and then to carry out the resulting Action, generally to update the Properties and/or associated Access Control. With respect to new or updated Directives, a list of all Resources matching the Directives Criteria is retrieved and then an iteration process through the Resources is initiated, collecting the Metadata from each Resource, finding the applicable Directives, a combination of the new or updated Directives and some or all of the prior established Directives, then combining the Directives and again resolving conflicts and then carrying out the resulting Actions, repeating the iteration until each applicable Resource is processed in accordance with the new or updated Directive.

Figure 4:
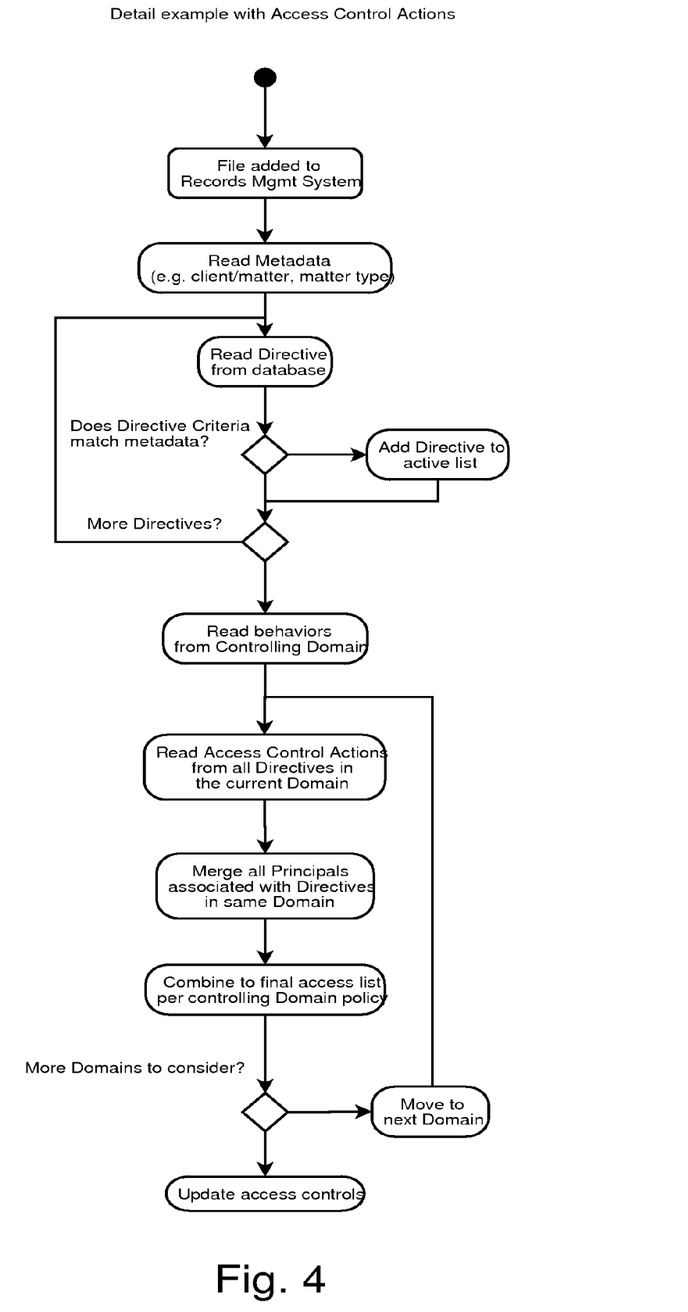
FIG. 4 provides a detailed example with Access Control Directives, specifically with respect to the addition of a file to the records management system.

FIG. 4 provides a detailed example with Access Control Directives, specifically with respect to the addition of a file to the records management System. As shown therein, the Metadata for the file is read, the corresponding Directive from the Database is read, and the two compared to see if the Directive Criteria matches the Metadata. If it does, the Directive is placed on an active list, and a determination is made as to whether there are more Directives applicable. If so, the Metadata is compared with each additional Directive, until all applicable Directives have been checked. Then the Behaviors for the highest priority Domain of the Directives in the active list is read, all Principals associated with Directives in the Domain are merged and combined to a final Access list per the Behaviors contained in the Controlling Domain. If there are more Domains left to be considered, the Program loops back to consider them. If not, the Access Controls for the file are updated.

As an example regarding Access, the Behaviors are only read from the highest priority Domain. Assume that some clients have asked that their matters be kept confidential—only people who legitimately need Access are to be allowed. Call this "confidential" matter. Another few clients have requested absolute secrecy—no one is allowed Access unless the client explicitly signs off on that person. Call this a "Top Secret" matter. A Policy might be created that states that "confidential" matters should be Accessible only by listed attorneys as well as anybody in the word processing support staff. This supports the firm's operational needs but does not expose the matter to other attorneys (who might be conflicted due to other client relationships). For the "Top Secret" matters, the Policy might state that only those explicitly listed may have Access.

In the present invention, this might be implemented by defining three Domains as follows: 1) "OPS" for firm operational Directives, 2) "CONF" for confidential matters and 3) "TS" for Top Secret matters. Directives in the Policies for the confidential matters would be assigned to the "CONF" Domain and the Top Secret Matters to the "TS" Domain. Lastly, a general firm Policy would have a Directive giving word processors Access to all documents—this Directive is assigned to the "OPS" Domain.

The Behaviors for the TS Domain specify that Access Control Actions from any other Domains can only serve to further limit Access—no increase in Access is allowed. On the other hand, the "CONF" Domain specifies that Access Control Actions in the "OPS" Domain may extend Access (in this case allowing word processing personnel to have Access).

A Domain is selected by (referring to the flowchart of FIG. 4) looking at all directives that apply to a Resource, then going through the Domains associated with the directives and selecting the highest priority Domain (the Controlling Domain) and then reading it's Behaviors (Read Behaviors from Controlling Domain). Those Behaviors control two of the following steps, which are a) merging the Access Control from all Directives in the same Domain, and b) Combining Access Control from different Domains. b) doesn't really come into play on the first loop, since the other Domains haven't entered the picture yet. Now, if there are "More Domains to consider" (meaning the Criteria for Directives in other Domains matches the Resource), then we loop back, read the Access Control information from the next Domain's Directives and a) merge the Access Control in the next Domain and b) combine that with the Access Control from the first loop. Both a) and b) are under control of the first set of Behaviors at all times.

Thus the present invention has a number of aspects that may be advantageously used in various combinations, which include:

1. Central Control—providing mechanisms for mapping simple Policy statements onto various Systems in a meaningful way.

2. Policy Database—providing ways to capture the practical meaning of a Policy in the context of the Systems it affects (or may affect in the future).

And may further include:

3. Conflict Resolution—providing flexible and sensible methods for resolving Policy conflicts. A sort of Policy Policy, or meta-Policy.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of centralized policy control comprising:
reading information, by a processor, from a database including a plurality of directives, the plurality of directives including criteria, wherein the plurality of directives include conflicting directives;
selecting, by the processor, at least one resource based on the criteria, wherein the at least one resource is identified by the criteria, wherein the plurality of directives includes a list of principals who can access the at least one resource;
resolving, by the processor, the plurality of directives that are conflicting directives by applying a function to obtain at least one action that is free of conflicts, wherein the function applies set arithmetic including at least one of intersect function, union function, and subtraction function, wherein the at least one action that is free of conflicts includes access controls that are free of conflicts; and
performing, in accordance with the plurality of directives, the at least one action by the processor on the at least one resource or on a metadata associated with the at least one resource,
wherein performing, in accordance with the plurality of directives, the at least one action comprises applying the access controls that are free of conflicts to the metadata associated with the at least one resource, the metadata having access controls that are free of conflicts applied thereon blocking anyone other than the principals on the list from accessing the at least one resource.

2. The method of claim 1, wherein the at least one action is performed upon or within an application.

3. The method of claim 1, wherein the at least one action performed on the at least one resource is one of: creation, deletion, destruction, relocation and change.

4. The method of claim 1 wherein the at least one action performed on the metadata of the at least one resource is one of: creation, deletion and change.

5. The method of claim 1, further comprising: providing a notification to a person of the at least one action being performed.

6. The method of claim 1, further comprising: providing a notification that signals a violation of one of the plurality of directives has occurred.

7. The method of claim 1, further comprising: providing a notification to an application to invoke a process or procedure.

8. The method of claim 1, wherein the at least one action being to record a log entry.

9. The method of claim 1, further comprising: performing at least one action based on the metadata of the at least one resource, on a plurality of resources associated with the at least one resource.

10. The method of claim 1, further comprising scheduling at least one subsequent action to occur at a future date.

11. The method of claim 10, wherein the at least one subsequent action performed includes at least one of: creating, deleting, destroying, disposing, relocating and changing the at least one resource.

12. The method of claim 1, further comprising: selecting a subset of the plurality of directives.

13. The method of claim 12, further comprising: selecting a subset of the plurality of directives based on at least one of: current date and current time.

14. The method of claim 12, further comprising: selecting a subset of the plurality of directives based on a current state of the metadata of the at least one resource.

15. The method of claim 1, wherein the at least one action performed is a minimal set of access control actions, wherein performing the minimal set changes an access control setting of each of the at least one resources to be less restrictive than that specified by the plurality of directives, the minimal set being one or more access control actions.

16. The method of claim 1, wherein the access control action permits or restricts the ability to change or delete the at least one resource or the metadata associated with the at least one resource.

17. The method of claim 1, wherein the method is initiated on a periodic basis.

18. The method of claim 1, wherein the method is initiated when a change is made to the database.

19. The method of claim 1, wherein the method is initiated when the at least one resource or the metadata associated with the at least one resource is added, removed or changed.

20. The method of claim 1, further comprising:
providing a first notification that signals a violation of one of the plurality of directives has occurred, or
providing a second notification to an application to invoke a process or procedure.

21. The method of claim 1, wherein
performing, in accordance with the plurality of directives, the at least one action comprises removing or inactivating documents containing confidential information.

22. The method of claim 21, further comprising:
providing a first notification that signals a violation of one of the plurality of directives has occurred, or
providing a second notification to an application to invoke a process or procedure.

23. The method of claim 1, further comprising:
the plurality of directives includes retention directives for the at least one resource, wherein retention directives include a time for destruction of the at least one resource, and
performing, in accordance with the plurality of directives, the at least one action comprises deleting the at least one resource at the time for destruction.

24. The method of claim 1, further comprising:
providing a notification that signals that a destruction of the at least one resource is required and the notification to arrange for the destruction of the at least one resource,
wherein the plurality of directives includes retention directives for the at least one resource, wherein retention directives include a time for destruction of the at least one resource.

25. The method of claim 1, wherein performing the at least one action is in accordance with the plurality of directives and a defined behavior.

26. The method of claim 1, wherein, if the at least one action includes conflicting actions, the conflicting actions are resolved based on priorities associated the plurality of directives.

27. The method of claim 1, wherein the metadata associated with the at least one resource comprises a record of activity for the at least one resource.

28. The method of claim 1, wherein the metadata associated with the at least one resource comprises an aggregate of metadata from a plurality of systems, said systems include heterogeneous systems, homogeneous systems or a mixture of both heterogeneous systems and homogeneous systems.

29. The method of claim 1, wherein the criteria includes a plurality of conditions upon one or more items of metadata.

30. The method of claim 1, wherein the criteria includes a statistical operation upon one or more items of metadata.

31. A method of centralized policy control comprising:
reading information, by a processor, from a database including a plurality of directives, the plurality of directives including criteria, wherein the plurality of directives include conflicting directives;
selecting, by the processor, at least one resource based on the criteria, wherein the at least one resource is identified by the criteria, wherein the plurality of directives includes a list of principals who cannot access the at least one resource;
resolving, by the processor, the plurality of directives that are conflicting directives by applying a function to obtain at least one action that is free of conflicts, wherein the function applies set arithmetic including at least one of intersect function, union function, and subtraction function, wherein the at least one action that is free of conflicts includes access controls that are free of conflicts; and
performing, in accordance with the plurality of directives, at least one action by the processor on the at least one resource or on a metadata associated with the at least one resource, wherein performing, in accordance with the plurality of directives, the at least one action comprises applying the access controls that are free of conflicts to the metadata associated with the at least one resource, the metadata having access controls that are free of conflicts applied thereon blocking principals on the list of principals from accessing the at least one resource.

32. The method of claim 31, wherein the at least one action is performed upon or within an application.

33. The method of claim 31, wherein the at least one action performed on the at least one resource is one of: creation, deletion, destruction, relocation and change.

34. The method of claim 31, wherein the at least one action performed on the metadata of the at least one resource is one of: creation, deletion and change.

35. The method of claim 31, further comprising providing a notification to a person of the at least one action being performed.

36. The method of claim 31, further comprising providing a notification that signals a violation of one of the plurality of directives has occurred.

37. The method of claim 31, further comprising providing a notification to an application to invoke a process or procedure.

38. The method of claim 31, wherein the at least one action being to record a log entry.

39. The method of claim 31, further comprising providing at least one action based on the metadata of the at least one resource, on a plurality of resources associated with the at least one resource.

40. The method of claim 31, further comprising scheduling at least one subsequent action to occur at a future date.

41. The method of claim 40, wherein the at least one subsequent action performed includes at least one of: creating, deleting, destroying, disposing, relocating and changing the at least one resource.

42. The method of claim 31, further comprising selecting a subset of the plurality of directives.

43. The method of claim 31, further comprising selecting a subset of the plurality of directives based on at least one of: a current date and a current time.

44. The method of claim 31, further comprising selecting a subset of the plurality of directives based on a current state of the metadata of the at least one resource.

45. The method of claim 31, wherein the at least one action performed is a minimal set of access control actions, wherein performing the minimal set changes an access control setting of each of the at least one resources to be less restrictive than that specified by the plurality of directives, the minimal set being one or more access control actions.

46. The method of claim 31, wherein the access control action permits or restricts the ability to change or delete the at least one resource or the metadata associated with the at least one resource.

47. The method of claim 31, further comprising initiating the method on a periodic basis.

48. The method of claim 31, further comprising initiating the method when a change is made to the database.

49. The method of claim 31, further comprising initiating the method when the at least one resource or the metadata associated with the at least one resource is added, removed or changed.

50. The method of claim 31, further comprising
providing a first notification that signals a violation of one of the plurality of directives has occurred, or
providing a second notification to an application to invoke a process or procedure.

51. The method of claim 31, wherein
performing, in accordance with the plurality of directives, the at least one action comprises removing or inactivating documents containing confidential information.

52. The method of claim 51, further comprising
providing a first notification that signals a violation of one of the plurality of directives has occurred, or
providing a second notification to an application to invoke a process or procedure.

53. The method of claim 31, wherein
the plurality of directives includes retention directives for the at least one resource, wherein retention directives include a time for destruction of the at least one resource, and
wherein performing, in accordance with the plurality of directives, the at least one action comprises deleting the at least one resource at the time for destruction.

54. The method of claim 31, further comprising
providing a notification that signals that a destruction of the at least one resource is required and the notification to arrange for the destruction of the at least one resource, wherein the plurality of directives includes retention directives for the at least one resource, wherein retention directives include a time for destruction of the at least one resource.

55. The method of claim 31, further comprising performing the at least one action is in accordance with the plurality of directives and a defined behavior.

56. The method of claim 31, wherein, if the at least one action includes conflicting actions, the conflicting actions are resolved based on priorities associated the plurality of directives.

57. The method of claim 31, wherein the metadata associated with the at least one resource comprises a record of activity for the at least one resource.

58. The method of claim 31, wherein the metadata associated with the at least one resource comprises an aggregate of metadata from a plurality of systems, said systems include heterogeneous systems, homogeneous systems or a mixture of both heterogeneous systems and homogeneous systems.

59. The method of claim 31, wherein the criteria includes a plurality of conditions upon one or more items of metadata.

60. The method of claim 31, wherein the criteria includes a statistical operation upon one or more items of metadata.

61. A non-transitory computer-readable storage medium having instructions stored thereon, which when executed by a computer, causes the computer to perform operations comprising:
   reading information from a database including a plurality of directives, the plurality of directives including criteria, wherein the plurality of directives include conflicting directives;
   selecting at least one resource based on the criteria, wherein the at least one resource is identified by the criteria, wherein the plurality of directives includes a list of principals who can access the at least one resource;
   resolving the plurality of directives that are conflicting directives by applying a function to obtain at least one action that is free of conflicts, wherein the function applies set arithmetic including at least one of intersect function, union function, and subtraction function, wherein the at least one action that is free of conflicts includes access controls that are free of conflicts; and
   performing, in accordance with the plurality of directives, at least one action on the at least one resource or on a metadata associated with the at least one resource,
   wherein performing, in accordance with the plurality of directives, the at least one action comprises applying the access controls that are free of conflicts to the metadata associated with the at least one resource, the metadata having access controls that are free of conflicts applied thereon blocking anyone other than the principals on the list from accessing the at least one resource.

62. The non-transitory computer-readable storage medium of claim 61, wherein the at least one action is performed upon or within an application.

63. The non-transitory computer-readable storage medium of claim 61, wherein the at least one action performed on the at least one resource is one of: creation, deletion, destruction, relocation and change.

64. The non-transitory computer-readable storage medium of claim 61 wherein the at least one action performed on the metadata of the at least one resource is one of: creation, deletion and change.

65. The non-transitory computer-readable storage medium of claim 61, the computer to perform operations further comprising: providing a notification to a person of the at least one action being performed.

66. The non-transitory computer-readable storage medium of claim 61, the computer to perform operations further comprising: providing a notification that signals a violation of one of the plurality of directives has occurred.

67. The non-transitory computer-readable storage medium of claim 61, the computer to perform operations further comprising: providing a notification to an application to invoke a process or procedure.

68. The non-transitory computer-readable storage medium of claim 61, wherein the at least one action being to record a log entry.

69. The non-transitory computer-readable storage medium of claim 61, the computer to perform operations further comprising: performing at least one action based on the metadata of the at least one resource, on a plurality of resources associated with the at least one resource.

70. The non-transitory computer-readable storage medium of claim 61, the computer to perform operations further comprising: scheduling at least one subsequent action to occur at a future date.

71. The non-transitory computer-readable storage medium of claim 70, wherein the at least one subsequent action performed includes at least one of: creating, deleting, destroying, disposing, relocating and changing the at least one resource.

72. The non-transitory computer-readable storage medium of claim 61, the computer to perform operations further comprising: selecting a subset of the plurality of directives.

73. The non-transitory computer-readable storage medium of claim 72, the computer to perform operations further comprising: selecting a subset of the plurality of directives based on at least one of: a current date and a current time.

74. The non-transitory computer-readable storage medium of claim 73, the computer to perform operations further comprising: selecting a subset of the plurality of directives based on a current state of the metadata of the at least one resource.

75. The non-transitory computer-readable storage medium of claim 61, wherein the at least one action performed is a minimal set of access control actions, wherein performing the minimal set changes an access control setting of each of the at least one resources to be less restrictive than that specified by the plurality of directives, the minimal set being one or more access control actions.

76. The non-transitory computer-readable storage medium of claim 61, wherein the access control action permits or restricts the ability to change or delete the at least one resource or the metadata associated with the at least one resource.

77. The non-transitory computer-readable storage medium of claim 61, further comprising:
   providing a first notification that signals a violation of one of the plurality of directives has occurred, or
   providing a second notification to an application to invoke a process or procedure.

78. The non-transitory computer-readable storage medium of claim 61, wherein
   performing, in accordance with the plurality of directives, the at least one action comprises removing or inactivating documents containing confidential information.

79. The non-transitory computer-readable storage medium of claim 78, the computer to perform operations further comprising:
   providing a first notification that signals a violation of one of the plurality of directives has occurred, or
   providing a second notification to an application to invoke a process or procedure.

80. The non-transitory computer-readable storage medium of claim 61, further comprising:
   the plurality of directives includes retention directives for the at least one resource, wherein retention directives include a time for destruction of the at least one resource, and
   performing, in accordance with the plurality of directives, the at least one action comprises deleting the at least one resource at the time for destruction.

81. The non-transitory computer-readable storage medium of claim 61, further comprising:
   providing a notification that signals that a destruction of the at least one resource is required and the notification to arrange for the destruction of the at least one resource, wherein the plurality of directives includes retention directives for the at least one resource, wherein retention directives include a time for destruction of the at least one resource.

82. The non-transitory computer-readable storage medium of claim 61, wherein performing the at least one action is in accordance with the plurality of directives and a defined behavior.

83. The non-transitory computer-readable storage medium of claim 61, wherein, if the at least one action includes conflicting actions, the conflicting actions are resolved based on priorities associated the plurality of directives.

84. The non-transitory computer-readable storage medium of claim 61, wherein the metadata associated with the at least one resource comprises a record of activity for the at least one resource.

85. The non-transitory computer-readable storage medium of claim 61, wherein the metadata associated with the at least one resource comprises an aggregate of metadata from a plurality of systems, said systems include heterogeneous systems, homogeneous systems or a mixture of both heterogeneous systems and homogeneous systems.

86. The non-transitory computer-readable storage medium of claim 61, wherein the criteria includes a plurality of conditions upon one or more items of metadata.

87. The non-transitory computer-readable storage medium of claim 61, wherein the criteria includes a statistical operation upon one or more items of metadata.

88. The non-transitory computer-readable storage medium of claim 61, wherein the computer is caused to perform the operations on a periodic basis.

89. The non-transitory computer-readable storage medium of claim 61, wherein the computer is caused to perform the operations when a change is made to the database.

\* \* \* \* \*